(12) United States Patent
Broad et al.

(10) Patent No.: US 9,849,638 B2
(45) Date of Patent: Dec. 26, 2017

(54) PROCESS AND APPARATUS FOR FLUFFING A CLEANING IMPLEMENT

(71) Applicant: The Procter & Gamble Company, Cincinnati, OH (US)

(72) Inventors: Gavin John Broad, Liberty Township, OH (US); Mark Mason Hargett, Liberty Township, OH (US); Richard Matthew Giachetto, Loveland, OH (US); Patrick John Healey, West Chester, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 823 days.

(21) Appl. No.: 14/164,608

(22) Filed: Jan. 27, 2014

(65) Prior Publication Data

US 2014/0225291 A1     Aug. 14, 2014

Related U.S. Application Data

(60) Provisional application No. 61/762,477, filed on Feb. 8, 2013.

(51) Int. Cl.
*B29C 71/00* (2006.01)
*A47L 13/26* (2006.01)

(52) U.S. Cl.
CPC ............ *B29C 71/009* (2013.01); *A47L 13/26* (2013.01)

(58) Field of Classification Search
CPC .................................................. B29C 71/009
See application file for complete search history.

(56) References Cited

U.S. PATENT DOCUMENTS

| | | | |
|---|---|---|---|
| 823,725 A | 6/1906 | Hayden | |
| 4,145,787 A | 3/1979 | Bastian | |
| 4,468,845 A | 9/1984 | Harris | |
| 5,953,784 A | 9/1999 | Suzuki et al. | |
| 6,241,835 B1 * | 6/2001 | Abe | A47L 13/20 156/290 |
| 6,743,392 B2 | 6/2004 | Tanaka et al. | |
| 6,813,801 B2 | 11/2004 | Tanaka et al. | |
| 6,968,591 B2 | 11/2005 | Tanaka et al. | |
| 7,003,856 B2 | 2/2006 | Hayashi et al. | |
| 6,984,615 B2 | 11/2006 | Kenmochi et al. | |
| 7,228,587 B2 | 6/2007 | Tanaka et al. | |
| 7,231,685 B2 | 6/2007 | Tanaka et al. | |

(Continued)

FOREIGN PATENT DOCUMENTS

| | | |
|---|---|---|
| EP | 1096047 A1 | 5/2001 |
| JP | A-2006-158866 A | 6/2006 |

(Continued)

OTHER PUBLICATIONS

PCT Search Report PCT/US2014/014084; Dated Jan. 31, 2014; 11 Pages.

*Primary Examiner* — Larry Thrower
(74) *Attorney, Agent, or Firm* — Larry L. Huston (57) ABSTRACT

A method of and apparatus for fluffing a cleaning article. The cleaning article has a layer of tow fibers and a layer of sheet material, joined together in a layered construction. The apparatus and process spray a fluid blast onto the article, disrupting the tow fibers. The fluid may be air and causes different fibers to react so as to increase the volume of the cleaning article.

9 Claims, 8 Drawing Sheets

(56) References Cited

U.S. PATENT DOCUMENTS

| | | |
|---|---|---|
| 7,234,193 B2 | 6/2007 | Tanaka et al. |
| 7,234,194 B2 | 6/2007 | Tanaka et al. |
| 7,237,296 B2 | 7/2007 | Tanaka et al. |
| 7,237,297 B2 | 7/2007 | Tanaka et al. |
| 7,243,391 B2 | 7/2007 | Tanaka et al. |
| 7,251,851 B2 | 8/2007 | Lin et al. |
| 7,302,729 B2 | 12/2007 | Tanaka et al. |
| 7,302,730 B2 | 12/2007 | Tanaka et al. |
| 7,334,287 B2 | 2/2008 | Tanaka et al. |
| 7,566,671 B2 | 7/2009 | Hoadley et al. |
| 7,712,578 B2 | 5/2010 | Han |
| 7,779,502 B2 | 8/2010 | Fujiwara et al. |
| 7,803,726 B2 | 9/2010 | Policicchio et al. |
| 7,937,797 B2 | 5/2011 | Tsuchiya et al. |
| 8,186,001 B2 | 5/2012 | Tsuchiya et al. |
| 8,245,349 B2 | 8/2012 | Tsuchiya et al. |
| 2008/0040879 A1 | 2/2008 | Yang |
| 2008/0216269 A1 | 9/2008 | Tsutanaga et al. |
| 2010/0154156 A1* | 6/2010 | Takabayashi ........... A47L 13/20 15/209.1 |
| 2010/0319152 A1 | 12/2010 | Prizepasniak |
| 2012/0164530 A1 | 6/2012 | Temmyo et al. |
| 2013/0232706 A1 | 9/2013 | Policchio |
| 2013/0232710 A1 | 9/2013 | Policicchio |
| 2013/0232711 A1 | 9/2013 | Cooper |
| 2013/0232714 A1 | 9/2013 | Policicchio |
| 2014/0115917 A1 | 5/2014 | Yamada |
| 2014/0182779 A1 | 7/2014 | Yamashita et al. |
| 2014/0183780 A1 | 7/2014 | Yamashita |

FOREIGN PATENT DOCUMENTS

| | | |
|---|---|---|
| JP | 2008-006260 A | 1/2008 |
| JP | A-2009-195832 A | 9/2009 |

* cited by examiner

PROCESS AND APPARATUS FOR FLUFFING A CLEANING IMPLEMENT

FIELD OF THE INVENTION

The present invention relates to cleaning articles, more particularly to cleaning articles comprising tow fibers and the like and more particularly to fluffing of cleaning articles typically referred to as dusters.

BACKGROUND OF THE INVENTION

Various cleaning articles have been created for dusting and light cleaning. For example, cloth rags and paper towels used dry or wetted with polishing and cleaning compositions have been used on relatively flat surfaces. But, rags and paper towels are problematic for reasons such as hygiene (the user's hand may touch chemicals, dirt or the surface during cleaning), reach (it may be difficult to insert the user's hand with the rag or paper towel into hard-to-reach places) and inconvenience (cleaning between closely-spaced articles typically requires moving the articles).

To overcome the problems associated with using rags and paper towels, various dust gathering devices having feathers, lamb's wool, and synthetic fiber brushes have been utilized for more than a century, as illustrated by U.S. Pat. No. 823,725 issued in 1906 to Hayden. Such dust gathering devices can be expensive to manufacture, and as such are designed to be cleaned and reused. One problem associated with a reusable dust gathering device is that such dust gathering devices may not hold or trap dust very well. Soiled, reusable devices are typically cleaned via shaking or through other mechanical agitation. This process is not entirely satisfactory as it requires an extra step during, interrupting and/or following the cleaning process. Furthermore, the attempted restoration of the device may not be successful, allowing redeposition of the previously collected dust.

To address the problems experienced with reusable dust gathering devices, disposable cleaning articles have been developed which have limited re-usability. The cleaning article may be used for one job (several square meters of surface) and discarded as being disposable, or may be restored and re-used for more jobs, then discarded. Traditional cleaning articles including feather dusters, cloths, string mops, strip mops and the like, are not disposable for purposes of this invention.

These disposable cleaning articles may include brush portions made of synthetic fiber bundles, called tow fibers, attached to a sheet as shown in Publication 2010/0319152. The tow fibers and sheets in such articles may be bonded together as disclosed in U.S. Pat. Nos. 7,712,578; 7,566,671; 7,779,502; 7,937,797; 8,151,402; 8,186,001 and 8,245,349. Or the tow fibers may be attached to a plate as shown in U.S. Pat. No. 4,145,787. The cleaning articles may be manufactured using the processes disclosed in U.S. Pat. No. 6,743,392 and/or 7,003,856.

Such cleaning articles may be made, for example, according to U.S. Pat. Nos. 6,813,801; 6,968,591; 6,984,615; 7,228,587; 7,231,685; 7,234,193; 7,234,914; 7,237,296; 7,237,297; 7,243,391; 7302729; 7,302,730; and/or 7,334,287 (having a common related application). The patents in this linage have a common feature—strips laterally extending from both sides of a generally planar article. U.S. Pat. No. 5,953,784 teaches strips extending not only from both sides of the article, but also from the front. Other geometries include U.S. Pat. No. 7,566,671 which does not use laterally extending strips but cleans only from one side of the implement. U.S. Pat. Nos. 7,251,851 and 7,930,794 teach a handle for a duster and having a spiral configuration. Dusters which advantageously do not require gather strips are shown in commonly assigned P&G Cases: 12382 Ser. No. 13/416,334, having differential overhang between the sheet and fibers; 12383 Ser. No. 13/416,526, having a sheet with apertures; 12384 Ser. No. 13/416,486, having an elastically contracted sheet; and 12385 Ser. No. 13/416,420, having an elastically contracted upstanding panel, all filed Mar. 9, 2012. Optionally the cleaning article 10 may further comprise a non-planar structure, as disclosed in commonly assigned US publication 2011/0131746 A1, filed Dec. 4, 2009 or wetting as disclosed in commonly assigned U.S. Pat. No. 7,803,726.

All such cleaning articles are typically packaged in a flat state. A plurality of these articles may be stacked together in a common cardboard box. Such stacking increases the planarity of these articles, potentially leading to diminished cleaning performance.

To get optimum performance, a user should pre-fluff the cleaning article prior to use. Fluffing, as defined herein, is the process of increasing the apparent volume of the cleaning article without adding material to the cleaning article. The volume may be increased if the tow fibers and optionally any sheet layers extend out of the plane of a duster provided in a generally flat state. The fluffing process thereby de-densifies the cleaning article. In a particular embodiment, the tow fibers may extend radially outwardly approximately 360 degrees from the longitudinal axis. A desirably fluffed cleaning article has no, or only minimal, apparent planarity.

Even with instructions, many users simply do not correctly perform the fluffing step. Some users do not read the instructions and entirely skip this step. Fluffing can be frustrated if the gather strips are partially joined together due to improper cutting during manufacture, making the fluffing insufficient or more difficult. The user may tire of the fluffing steps and not fully complete this process.

Thus, there is a need for a cleaning article which does not require the user to perform fluffing at the point of use. Such cleaning article may be fluffed during manufacture, prior to sale and/or may be fluffed during dispensing. There is likewise a need for a manufacturing process/apparatus which allows the user to minimize or eliminate the problem of the often overlooked or improperly performed fluffing step.

SUMMARY OF THE INVENTION

The invention comprises a cleaning article, process of fluffing such a cleaning article and apparatus therefor.

DETAILED DESCRIPTION OF THE INVENTION

Figure 1A:
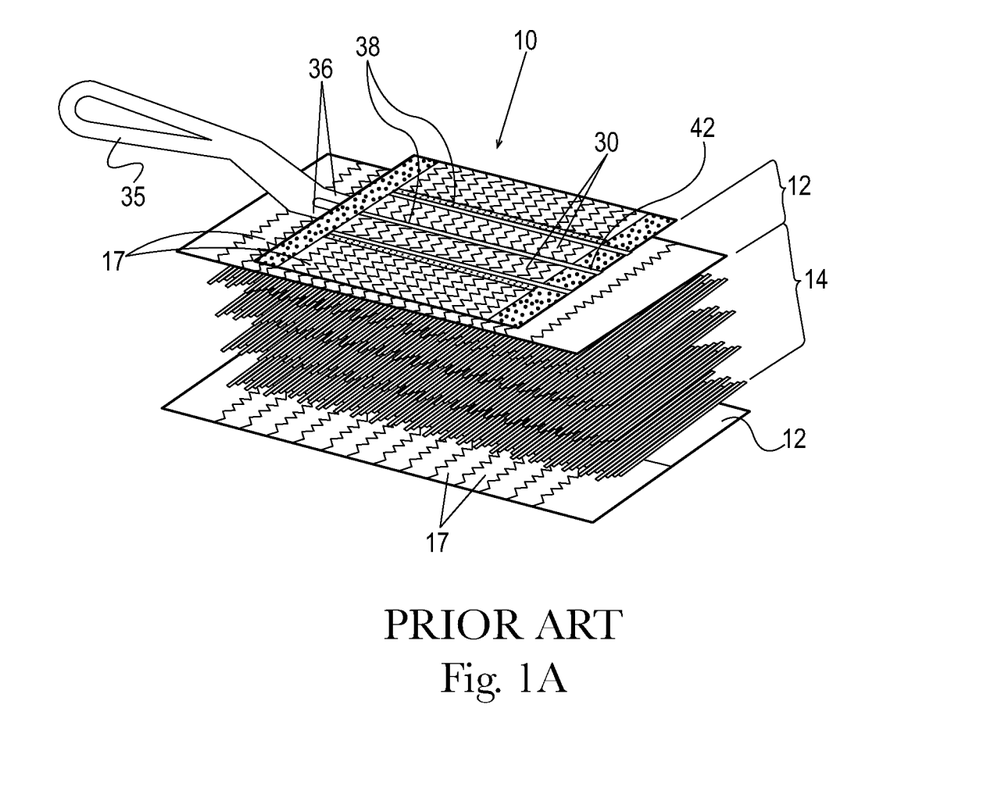
FIG. 1A is a schematic exploded perspective view of a cleaning article according to the prior art and having strips on two outer laminae.
Figure 1B:
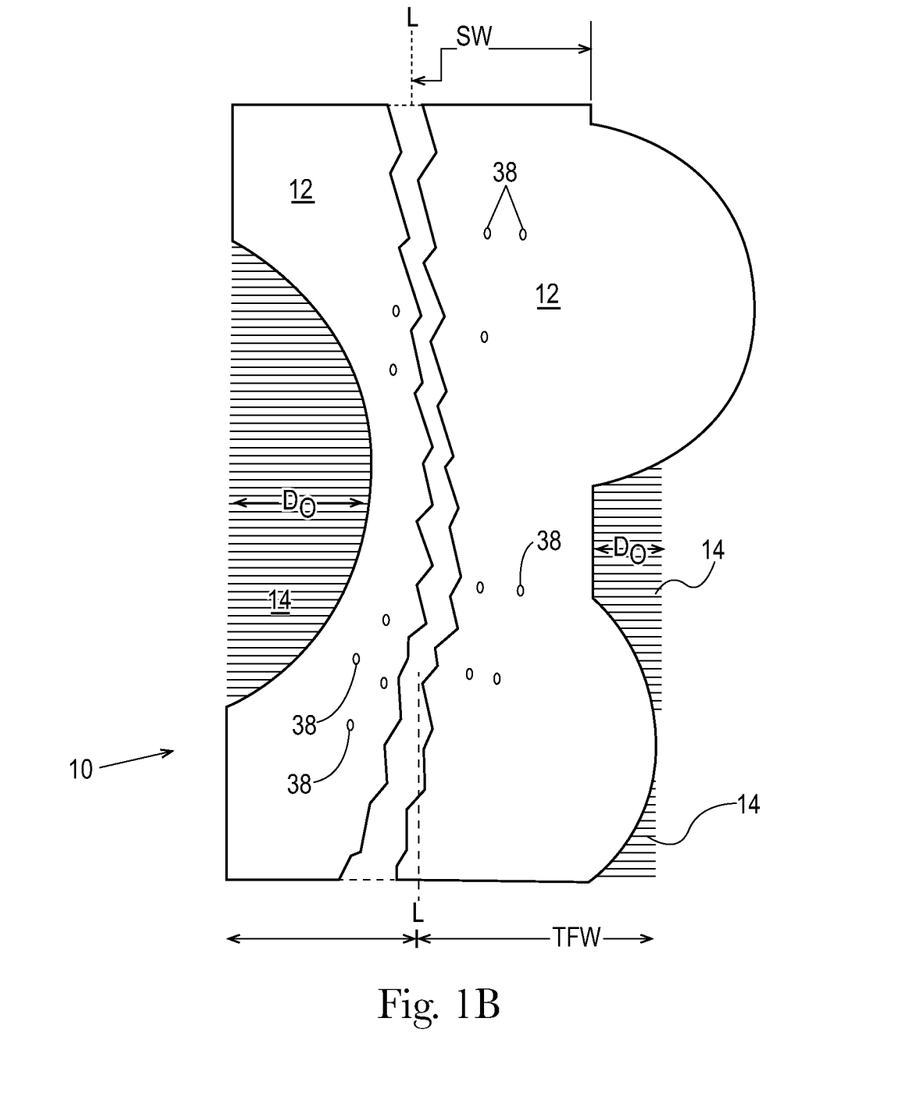
FIG. 1B is a broken schematic top plan view of a cleaning article according to the present invention and having a sheet with a concave notch on one side of the longitudinal axis L and having convex shapes on the other side of the longitudinal axis L.

Referring to FIGS. 1A and 1B, the cleaning article 10 may be generally elongate, having a longitudinal axis L, although other shapes are contemplated and feasible. These cleaning articles 10 are typically referred to as dusters. The cleaning article 10 may be removably attachable to a handle 35 and/or may be used without a handle 35. A suitable handle 35 is disclosed in commonly assigned US Publication 2011/00099764.

The z-direction of the cleaning article 10 is the direction perpendicular to the sheet 12 which is typically closest to the handle 35 (if present) of the cleaning article 10, the XY plane is defined as the plane defined by the sheet 12 and is typically perpendicular to the z-direction. The cleaning article 10 may have a longitudinal axis L and a transverse axis T orthogonal thereto. The cleaning article 10, and respective components thereof, may have two longitudinal edges 20 parallel to the longitudinal axis L and two transverse edges 22 parallel to the transverse axis T.

The length of the cleaning article 10, etc. is taken in the longitudinal direction. The width of the cleaning article 10 corresponds to the transverse direction perpendicular to the length direction and disposed within the plane of the sheet 12. The thickness is defined as the dimension in the z-direction. The length and width of the strips shown in the art are taken in the transverse and longitudinal directions, respectively.

The cleaning article 10 may be thought of as having two, three or more laminae joined in face-to-face relationship. The laminae may comprise a tow fiber lamina 14, intermediate two laminae of generally planar sheets 12. Alternatively, a single tow fiber layer 14 may be joined to a single generally planar sheet 12. The tow fiber layer 14 is shown to comprise four layers, although one of skill will understand from one to several layers are feasible and contemplated for use with the present invention. Likewise, one, two, three or more sheets 12 are feasible and contemplated for use with the present invention.

Referring particularly to FIG. 1A the cleaning article 10 may optionally further comprise gather strips 17, as known from the prior art. As used herein, gather strips 17 refer to cantilevered elements extending transversely outwardly from the longitudinal centerline of the article 10, and having a length (taken in the transverse direction) greater than the corresponding width (as taken in the longitudinal direction). The gather strips 17 lie within the XY plane as intended by manufacture, although may be deformed out of the XY plane due to fluffing before use, and/or deformations which occur in use due to movement against the target surface. The gather strips 17 may be incorporated into one of the sheets 12 described above or may be deployed on a separate sheet 12. The gather strips 17 may be incorporated on an outermost portion of the tow fiber bundle 14, be incorporated between tow fiber bundle layers 14 and/or combinations thereof.

An attachment system may provide for removable attachment of the cleaning article 10 to a suitable and optional handle 35. The cleaning article 10 attachment system and optional complementary handle 35 attachment may comprise adhesive joining, cohesive joining, mechanical engagement, etc. One common attachment system comprises sleeves 30 into which the tines 36 of the handle 35 may be inserted. The sleeves 30 may be disposed on an outer lamina 12.

Referring to FIGS. 1A and 1B, the sheet 12 may have an outwardly facing preferential cleaning side and a second inwardly facing attachment side opposed thereto. The sheet 12 may comprise a nonwoven sheet 12. Suitable nonwovens may be made according to commonly assigned U.S. Pat. Nos. 6,797,357; 6,936,330, D489,537 and/or D499,887.

Adjacent the sheet 12 may be a compressible and/or deformable second lamina of fibers 14. The second lamina may comprise tow fibers 14. The tow fiber lamina 14 may be joined to the sheet 12 in face-to-face relationship. The tow fiber lamina 14 may be suitable for directly contacting the target surface during cleaning.

The tow fibers 14 may be synthetic. As used herein "bundle fibers" and/or "tow" refer to fibers comprising synthetic polymers including polyester, polypropylene, polyethylene, bio-derived polymers such as polylactic acid, bio-polyethylene, bio-polyester and the like. Tow fibers 14 also include fibers from natural sources such as cellulose, cellulose acetate, flax, hemp, jute and mixtures thereof manufactured wherein the individual fibers are relatively long strands manufactured in bundles. The bundle fibers may be defined as any fibers having distinct end points and at least about 1 cm in length. The cleaning article 10 of the present invention may further comprise an optional absorbent core (not shown).

The sheet 12, fibrous layer 14 and non-planar structure 16 may be joined together by thermal bonding, autogenous bonding, ultrasonic bonding, heat sealing, adhesive and/or other means known in the art. The sheet 12 may comprise two plies, joined together in face-to-face relationship. The sheet 12, fibrous layer 14 and non-planar structure may be bonded in a pattern which provides a central spine 42 parallel the longitudinal axis L.

The joining of the tow fiber layer 14 and generally planar sheets 12 may be done with any combination of continuous bonds 38 and/or spot bonds 38, as known in the art. The bonds 38 may be used to create sleeves for an attachment system as known in the art and discussed herein.

The bonding pattern joining the two plies may be provided in a pattern which provides a sleeve 30 complementary to and able to receive the tines 36 of the handle 35, if used with the cleaning article 10 of the present invention. Particularly, the bonding may be provided in a pattern which is generally longitudinally oriented, so that the tines 36 may be inserted into the sleeve 30 created between adjacent bonds 38.

The bond pattern may provide a continuously bonded or discretely bonded central spine 42. Outboard of the central spine 42, the bond pattern may comprise one or more continuous or discontinuous bond sites. The space between the central spine 42 bond and the outboard bonds 38 may create a sleeve 30 for receiving a tine 36 of the optional handle 35. If desired, the sheet 12 may be shrunk/strained in the cross-direction. This process can provide rugosities or wrinkles in sheet 12. The rugosities/wrinkles space apart the plies of sheet 12, allowing for easier insertion of the tines 36 into the sleeve 30, if so desired.

The cleaning article 10 according to the present invention for removable attachment to a handle 35 has a longitudinal axis L defining a longitudinal length. Again, the cleaning article 10 comprises at least one layer of tow fibers 14. The tow fibers 14 extend transversely outward from proximal ends juxtaposed with said longitudinal axis L to distal ends laterally remote therefrom. The tow fiber layer 14 further has first and second opposed faces and defines a tow fiber width TFW. The tow fiber width TFW is the distance from the longitudinal axis L to the distal end of a particular tow fibers 14 taken in a straight, planar and transverse direction. The tow fiber width TFW may be straight or variable throughout the longitudinal length.

The cleaning article 10 further comprises a generally planar sheet 12 disposed on a first face of the at least one layer of tow fibers 14. The sheet 12 having a sheet 12 width SW taken in a straight, planar and transverse direction. The sheet 12 width may predominantly be less than the tow fiber width TFW. The difference between sheet 12 width SW and tow fiber width TFW varies along a predominant portion of the longitudinal length of the cleaning article 10. This geometry is referred to herein as differential overhang.

Referring particularly to FIG. 1B, if desired, each longitudinal edge of either and/or more sheets 12 may be notched to be concave, providing a sheet 12 referred to as concave. If the tow fiber layer 14 is of constant width, this arrangement provides a differential overhang DO which is relatively greater as the transverse axis T is approached and relatively lesser as either transverse edge is approached. This arrangement provides the advantage that the relatively greater differential overhang DO near the center of the cleaning article 10 may provide relatively greater fluffing of the tow fibers 14 near the center of the cleaning article 10.

If desired, the various cleaning articles 10 described herein may be packaged and sold in a kit. Some of the cleaning articles 10 may have the aforementioned concave sheet 12 and other cleaning articles 10 may have a convex sheet 12. This arrangement provides the benefit that the user has a choice of different cleaning articles 10 for different tasks.

One of skill will recognize that hybrids and combinations of the embodiments described above are contemplated and feasible. For example, a single cleaning article 10 may comprise plural sheets 12 having like or different geometries and/or plural tow fiber layers 14 having like or different geometries. Such sheets 12 and tow fiber layers 14 may be disposed next to each other, interspersed or placed in any desired configuration of layers.

Any of the sheet 12 and/or layer of tow fibers 14 may be completely or partially coated with adhesive, wax, Newtonian or non-Newtonian oils or a combination thereof, in order to improve cleaning and increase retention of absorbed debris. If desired, the cleaning article 10 may optionally be used with a cleaning solution or other solution usable for other purposes such as treating the surface for appearance or disinfectant, etc. The cleaning solution may be pre-applied to the cleaning article 10, creating a pre-moistened cleaning article 10 or may be contained within a separate reservoir for dosing onto the cleaning article 10 and/or target surface. The cleaning solution may comprise a majority water, and at least about 0.5, 2, 5 or 10% solids, or at least about 30% or 50% aqueous solvents, non-aqueous solutions or mixtures thereof (all by weight).

Figure 2A:
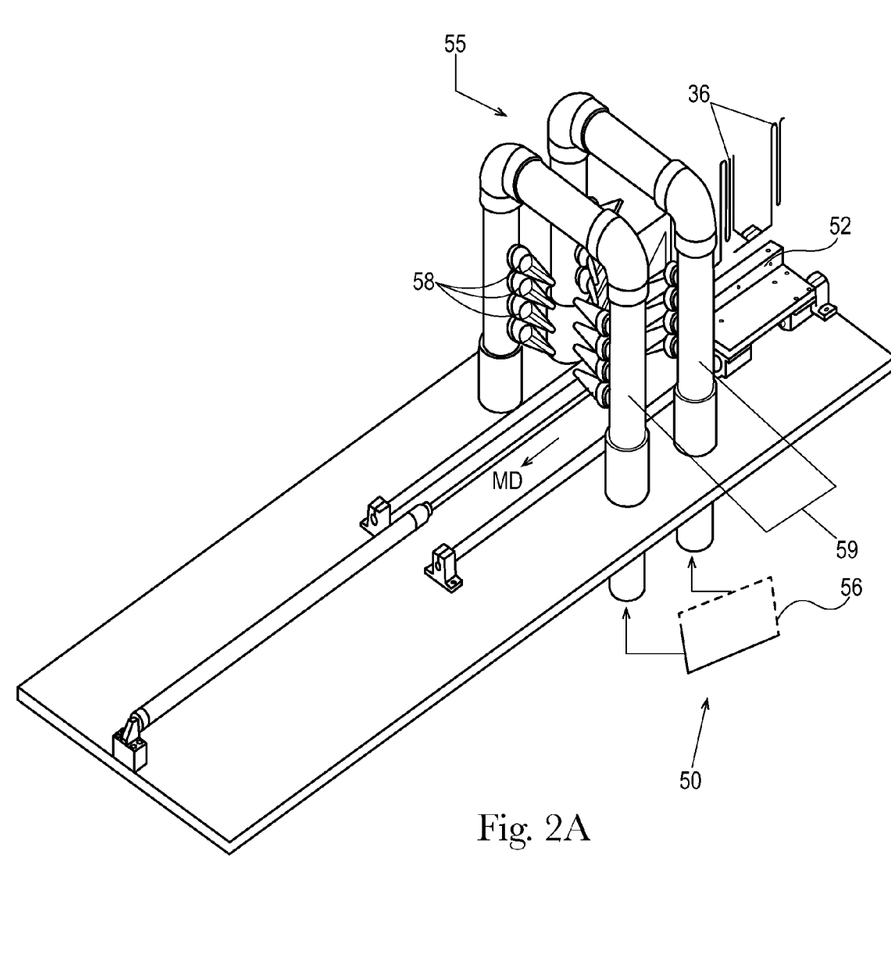
FIGS. 2A and 2B are perspective views of an exemplary apparatus according to the present invention, for fluffing a cleaning article according to the process of the present invention.
Figure 2B:
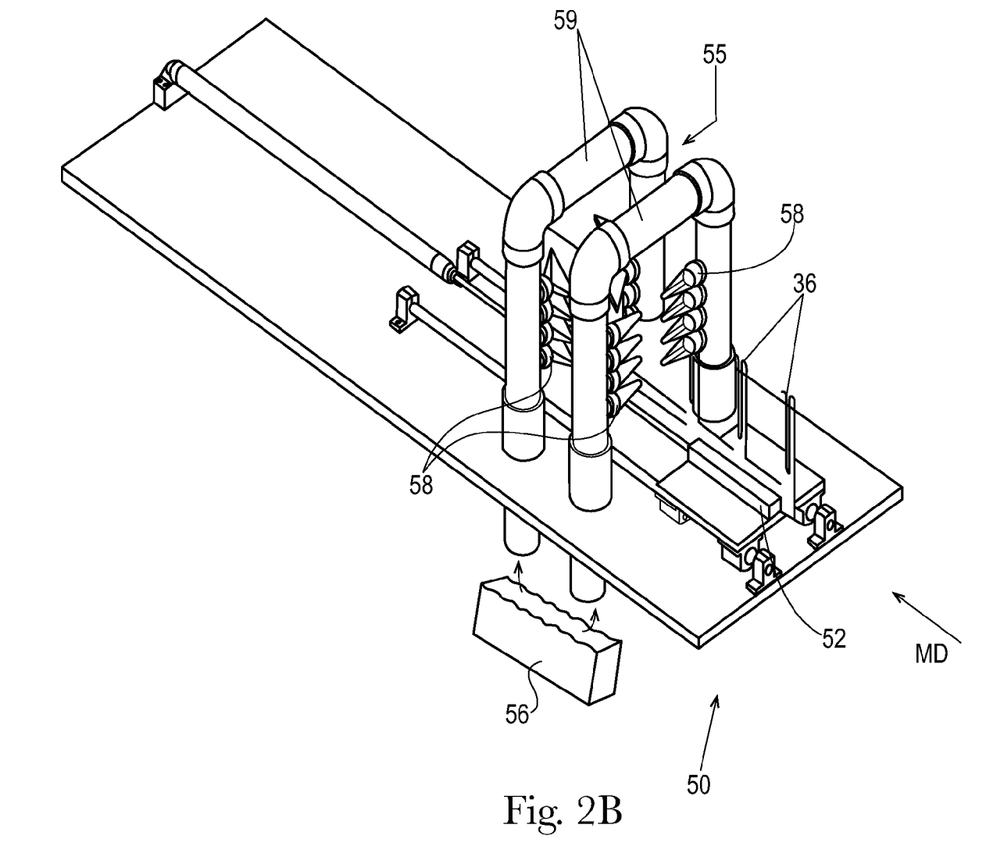

Referring to FIGS. 2A and 2B, the cleaning article 10 according to the present invention may be fluffed using a fluffing apparatus 50. The fluffing apparatus 50 has a carriage 52 for movement in the machine direction of the arrow as shown. The carriage 52 transports at least one cleaning article 10 relative to various components of the apparatus 50. The carriage 52 may move on a stationary track. An elongate carriage 52 track is shown, although one of skill will realize the invention is not so limited. The carriage 52 track may be circular or of any desired and suitable shape.

The carriage 52 track may comprise a rack gear with the carriage 52 moving on a pinion gear, with either the rack or pinion being driven. Alternatively, the carriage 52 may comprise a slider which translates on one or more complementary rails, as shown. Alternatively, a turret may be used, where each cleaning article is loaded onto an individual station. The carriage 52 may be powered by an electric motor, by pneumatic action, etc. as are well known in the art.

Figure 3:
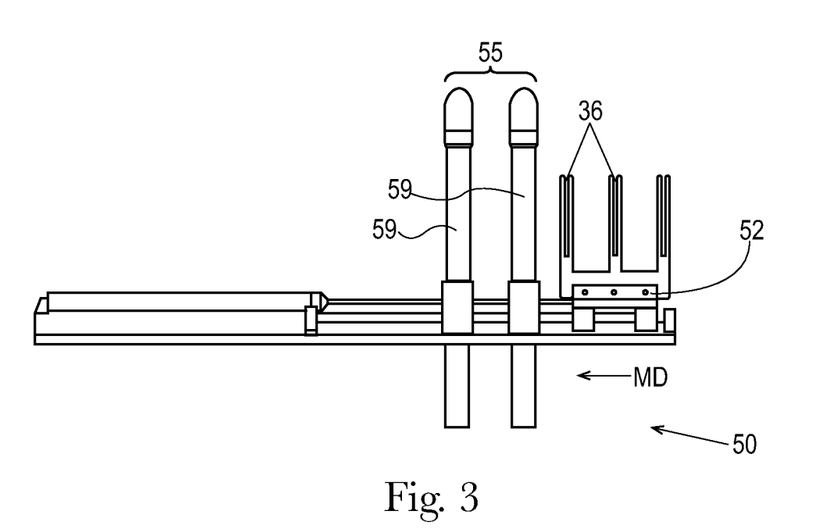
FIG. 3 is an side elevational view of the apparatus of FIGS. 2A and 2B.

Referring to FIG. 3 the carriage 52 may comprise one or more fork tines 36 for releasably holding a cleaning article thereon. The carriage 52, as illustrated, has three sets of fork tines 36 extending outwardly therefrom. One of skill will recognize the invention is not so limited. The carriage 52 may comprise one set of or any desired plurality of fork tines 36. If desired, the carriage 52 may comprise a continuous belt, as is known in the art. Any desired plurality of sets of fork tines 36 may be joined to the continuous belt style carriage 52, providing for constant motion.

The fork tines 36 extend from a proximal end rigidity or flexibly joined to the carriage 52 to a distal end onto which the duster may start the insertion process. The fork tines 36 may be equally or unequally spaced apart in the machine direction.

The fork tines 36 may pass a loading station where the cleaning articles 10 are installed onto the fork tines 36. At the loading station, the cleaning articles 10 may inserted onto the fork tines 36 by hand, as is known in the art or may use an automated loading mechanism.

The fork tines 36, once loaded, may move to and through a fluffing station 55. The carriage 52 may move through the fluffing station 55 without speed interruption in the machine direction, may intermittently pause/slow down at the fluffing station 55 or may stop at the fluffing station 55.

Referring back to FIGS. 1A and 1B, the fluffing station 55 may comprise a fluid delivery device. The fluid delivery device may comprise a fluid source 56. If air, is used as the fluid, an air compressor may suffice as a continuous fluid supply. Alternatively, the fluid source 56 may comprise a tank of compressed gas. The compressed gas may comprise air, nitrogen, hydrogen, hydrocarbons or combinations thereof.

The fluid may flow from the source 56 to one or more nozzles 58. The fluid is expelled through the nozzles 58, and onto one or more cleaning articles 10 in and/or moving through the fluffing station 55. The fluid impinges upon the components, particularly the tow fibers 14, of the cleaning article causing unpredicted disruption and or deformation thereof. The deformation of the cleaning article results in tow fiber 14 separation, tow fibers 14 and sheets moving out of the plane and an increase in apparent volume of the cleaning articles 10.

The fluffing station 55 may have one or more banks 59 of nozzles 58, with a plurality of nozzles 58 in each bank 59. A fluffing station 55 having two banks 59 of nozzles 58 with four opposed nozzles 58 on each side of the bank 59 is shown. But the invention is not so limited. One of skill will recognize any desired of equally or unequally sized banks 59 may be utilized. The banks 59 may contain one nozzle 58 or a plurality of nozzles 58 on a single side of the cleaning article 10. If a plurality of nozzles 58 is selected, the nozzles 58 may be equally or unequally spaced from each other and from the cleaning article 10. A first and second plurality of nozzles 58 may be provided on each side of the bank 59, so that the cleaning article 10 passes therebetween.

The nozzles 58 may have an orifice to direct the fluid towards or near the cleaning article 10 so that direct or indirect fluid impingement occurs. Equally side slot shaped nozzle 58 orifices are shown, although the invention is not so limited. The orifices may comprise equally sized or unequally sized slots, circular shapes, multiple orifices arranged to give a spiral fluid flow as is known in the art, etc.

The nozzles 58 may continuously or intermittently expel the desired fluid onto the cleaning article 10 as it passes through the bank 59. If continuous fluid flow is desired, the fluid may be controlled for mass flow rate, gage pressure above ambient, temperature, etc.

If intermittent fluid flow is desired, the same control factors may be considered. Further, as the cleaning article 10 approaches the banks 59 of nozzles 58 a trigger may provide an intermittent fluid burst. The burst may be timed to directly or indirectly impinge on the cleaning article 10 as it passes through the fluffing station 55. The burst may be indexed using a timer, proximity switch, electric eye, etc. as are known in the art.

After passing through the fluffing station 55, the cleaning article 10 may be treated with any post processing treatment desired. For example, the cleaning article 10 may be sprayed with adhesive droplets to assist in maintaining the fluffed cleaning article 10 geometry, and optionally thereafter with additional tow, cellulose and/or nonwoven fibers.

If desired, an incompressible fluid may be utilized. The incompressible fluid may be water, low viscosity oil, etc. The increased fluid mass is prophetically expected to provide greater disruption of the tow fibers 14, potentially allowing for increased throughput.

If desired, water sprayed onto the cleaning article 10 may be flash dried. This step provides the benefit of reducing fiber to fiber hydrogen bonding from water, particularly if the tow fibers 14 are absorbent, such as occurs with cellulose fibers 14. The flash drying may also assist in curing of fiber 14 finish or other coatings which may be present to add functionality. The heat source can also be used to preferentially encourage fiber 14, shrinkage resulting in further fiber 14 to fiber 14 separation and entanglement for added volume and volume retention.

A liquid, or prophetically gaseous, fluid may further comprise materials which improves cleaning, particularly dust trapping capability, and/or provides other functionality. For example, a liquid fluid may further comprise surfactant, solvent, anti-static, anti-allergen, disinfectant, oil, wax, silicone, pressure sensitive adhesive or other functionalities. The fluid may also be a molten solid that is heated to the liquid phase, to prophetically promote more even application to the fibers 14. This liquid can then be allowed to solidify at room temperature or via rapid cooling including chilled coils, or chilling gases such nitrogen.

The cleaning article 10 may be then packaged as desired. The cleaning article 10 may be compressed to a smaller apparent volume during packaging to conserve costs. Without being bound by theory, it is believed that a cleaning article 10 compressed during packaging will unexpectedly return to a relatively larger apparent volume upon removal from the compressed state at the point of use. While some hysteresis may occur, it is believed the apparent volume of the cleaning article 10 will be greater than if fluffing had not occurred, similar to teasing hair to increase apparent volume. Alternatively, the cleaning article 10 may be packaged with head space to prevent compression.

Various sizes, as determined by apparent volume, of cleaning articles 10, may be desired. For example, as large apparent volume, lower density cleaning article 10 may be preferred for a particular cleaning task. A more compact and differently shaped cleaning article 10 may be better suited for a different cleaning task.

If desired, plural sizes of the cleaning articles 10 may be sold together as a kit. This arrangement allows the user to select the particular cleaning article 10 best suited for the immediate task. The present invention is flexible in providing various opportunities to adjust the size and shape of the cleaning article 10.

Figure 4:
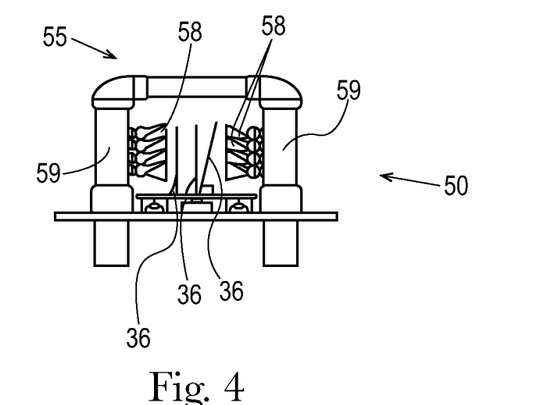
FIG. 4 is a side elevational view of the apparatus of FIGS. 2A and 2B, showing an alternative geometry of the tines.

For example, referring to FIG. 4, the fork tines 36 may be divided into a first plurality of fork tines 36 disposed at a first distance from the nozzles 58 in the bank 59. In a degenerate case, the fork tines 36 may be equally spaced form nozzles 58 on both sides of the carriage 52. A second plurality of tines 36 may be more loosely spaced to one set of nozzles 58. Yet a third plurality of tines 36, may have a third spacing, etc. This arrangement provides a correspond plurality of cleaning article 10 geometries. The tine 36 spacing may be adjusted and rearranged at will, advantageously providing flexibility in the manufacturing process.

Figure 4A:
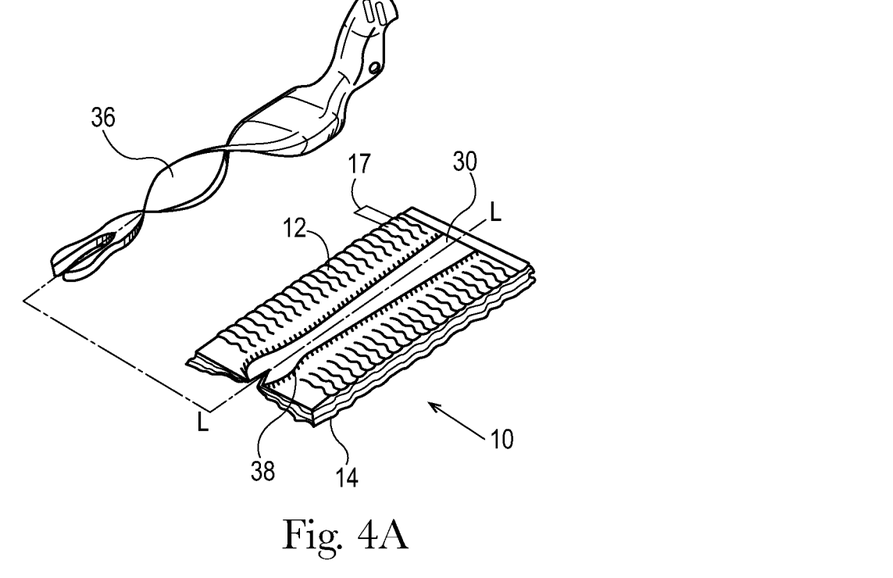
FIG. 4A is an exploded perspective view of an alternative tine, having a spiral configuration with a cleaning article remote therefrom.
Figure 4B:
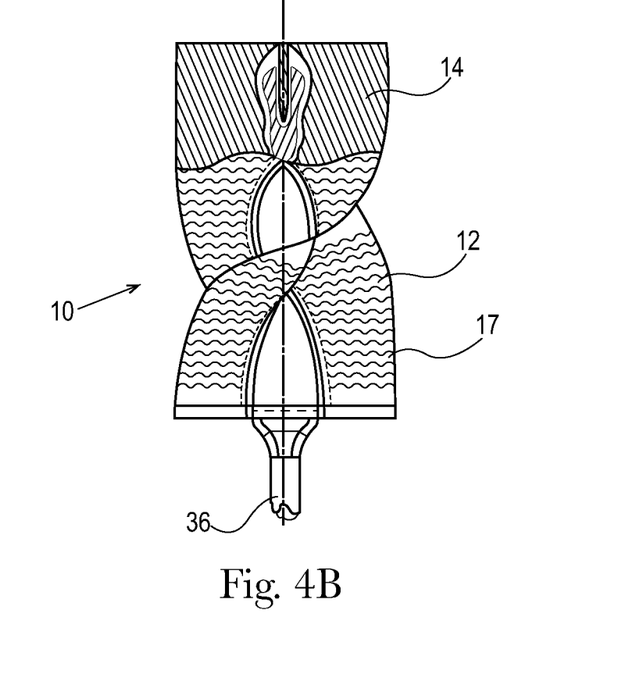
FIG. 4B is a schematic frontal view of the tine of FIG. 4B having a cleaning article installed thereon and shown partially in cutaway.

Referring to FIGS. 4A and 4B, the cleaning article may be installed on a spiral tine 36. The spiral tine 36 prophetically provides the benefit of providing more equally applied fluid flow and pressure throughout the cleaning article 10.

Figure 5:
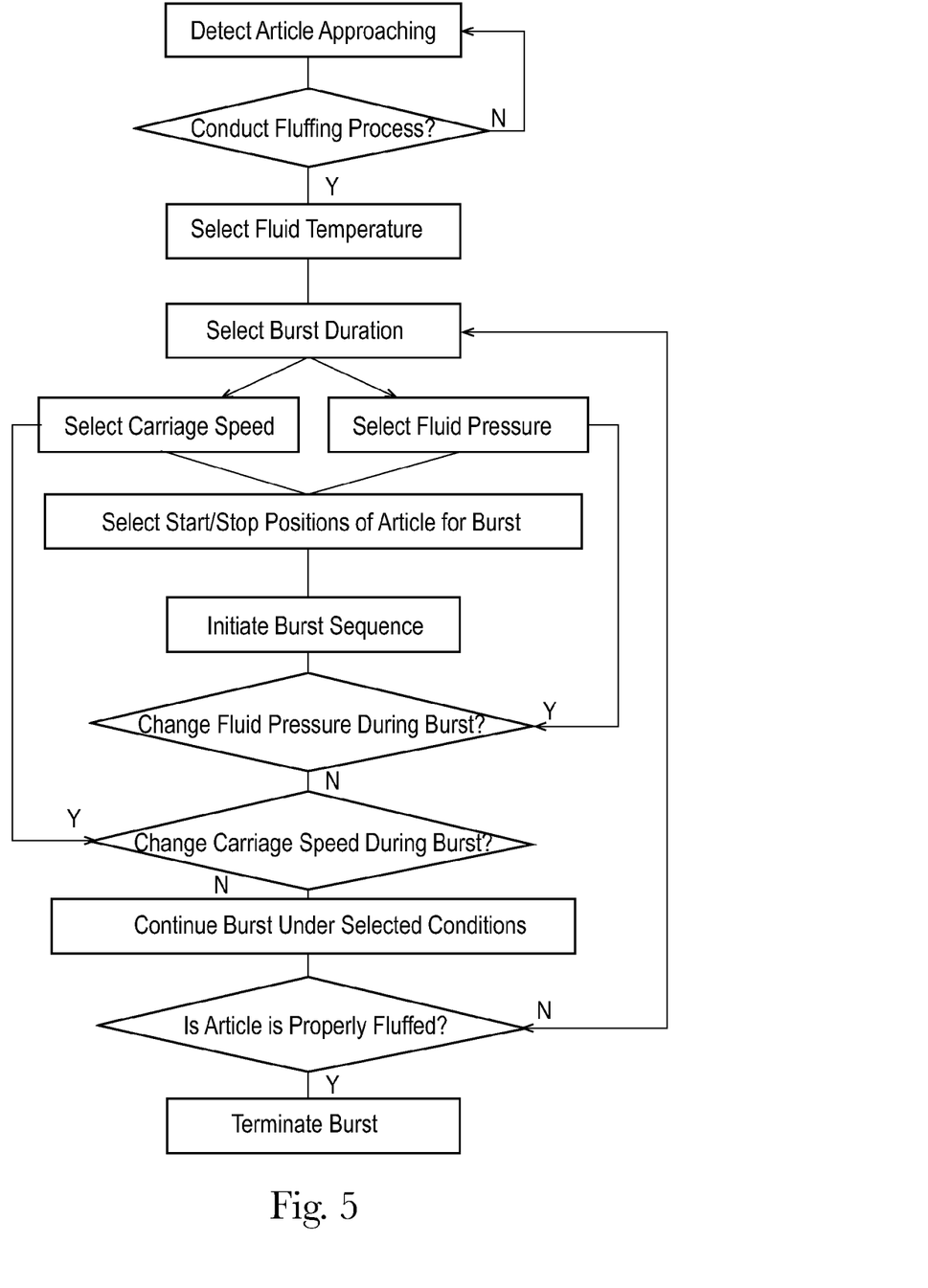
FIG. 5 is a block diagram of a software program to adjust operation of the fluffing station.

Referring to FIG. 5, the various size and geometries of the cleaning articles 10 may be accomplished by advantageously adjusting the timing, duration, pressure, etc. of the intermittent fluid impingement on the cleaning articles 10. For example fluid impingement on the leading edge, centerline and trailing edge of the cleaning articles 10 would prophetically be expected to provide three different resulting geometries and apparent volumes. A longer duration or higher pressure fluid burst would prophetically be expected to result in relatively greater apparent volume. Faster movement of the bank 59 of nozzles 58 and cleaning article 10 relative to the other would prophetically be expected to provide lesser fluffing than slower relative movement.

If desired the volume change and/or final volume of the cleaning article 10 may be determined in real time during the fluffing process. If the desired volume is not achieved at the outset, an additional bank 59 of nozzles 58 may be activated, the relative movement slowed/stopped, fluid pressure increased, additional nozzles 58 within a particular bank 59 activated, etc.

The initial and/or final volume, width or other dimension of the cleaning article 10 may be determined using a machine visions system, as known in the art. A suitable machine vision system is available from Mettler Toledo of Columbus, Ohio and may utilize a Cognex Insight 5604 camera. The camera may capture an image of the cleaning article 10 during the fluffing process.

If a sufficient number of the pixels in the field of the instantaneous photograph of the cleaning article are dark, i.e. below a pre-determined threshold, the cleaning article 10 may be considered sufficiently fluffed. If not, a feedback loop may determine additional fluffing is desirable, as shown in FIG. 5.

Figure 6:
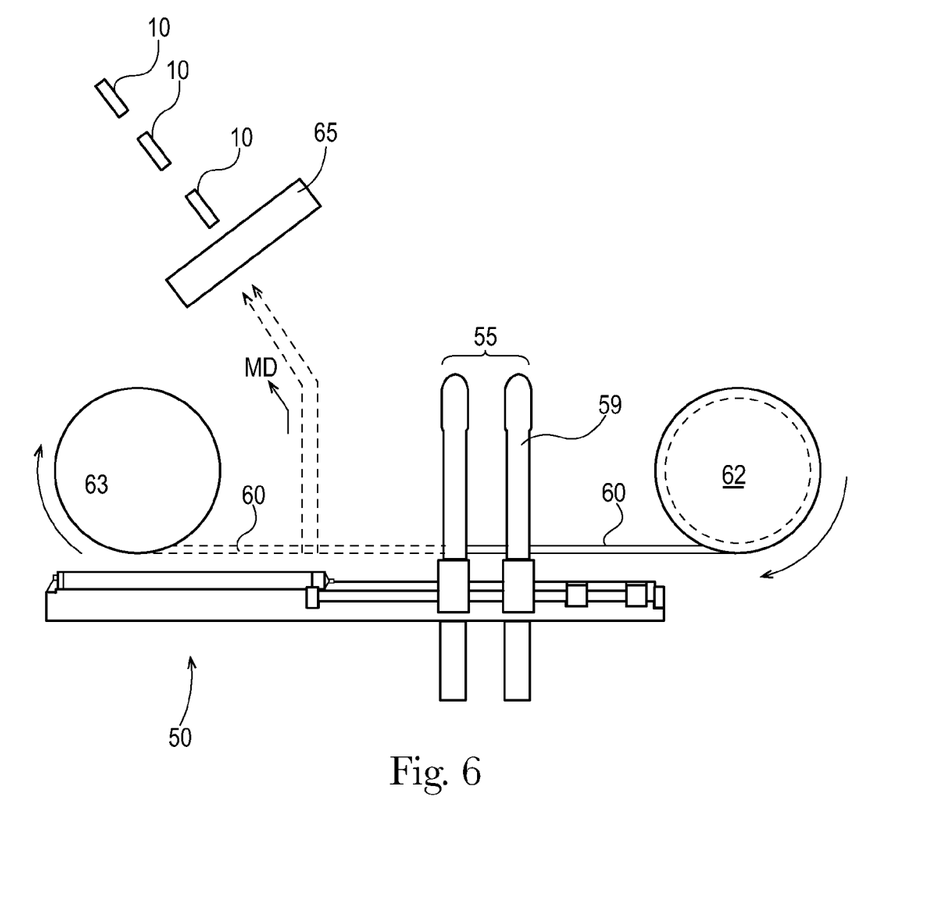
FIG. 6 is a side elevational view of an apparatus for fluffing the duster material still in continuous form during fluffing and showing schematic alternative takeup roll and cutting operations in phantom.

Referring to FIG. 6 the materials used to assemble the cleaning article 10 be passed through the fluffing station 55. Particularly, a laminate 60 comprising at least one layer of sheets 12 and tow fiber layers 14 may be assembled in continuous form, as is known in the art. The continuous laminate 60 may enter the fluffing station 55 from an unwind roll or similar supply source 56. The laminate 60 may be fluffed, as described above, then cut into discrete cleaning articles 10. Alternatively, the fluffed laminate 60 may be stored on a takeup roll 63 for later processing.

The laminate 60 may comprise an endless supply of indeterminate length. The supply may be sourced 56 from a supply roll 62 and pass through the banks 59 of nozzles 58 and wound onto a takeup roll 63, in known fashion. Alternatively, the laminate 60 may be taken directly from the forming station where one or more layers of to fibers and one or more layers of sheet material are joined in face to face relationship. The laminate 60 may then be moved past one or more banks 59 of nozzles 58 to have fluid therefrom impinged upon the laminate 60 reducing the density thereof. If desired, the laminate 60 may be cut into discrete cleaning articles after having the fluid impinged thereon. Alternatively, the fluffed laminate 60 may be taken to a cutting station 65. At the cutting station 65 the fluffed laminate 60 may be cut into discrete cleaning articles 10.

One of skill will recognize variations in this invention are feasible. For example, the cleaning article 10 may be fluffed using a vacuum rather than a positive pressure fluid flow. The cleaning article 10 may be supported on a plate, rather than tines as shown. The support plate may be pervious to allow positive and/or vacuum air flow therethrough.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A process for fluffing a duster, said process comprising the steps of providing a duster having a layer of tow fibers and a layer of sheet material joined in face to face relationship to form a laminate;
   moving said duster relative to at least one fluid nozzle and in proximity of said nozzle;
   blowing fluid through at least one nozzle onto said duster, to cause movement of the tow fibers and thereby fluff said duster and
   further comprising the step of determining said size of said duster during said process of fluffing, and selectively operating said at least one fluid nozzle in response to said determination of said duster size.

2. A process according to claim 1 wherein said step of providing at least one nozzle comprises the step of providing a bank of nozzles, said bank of nozzles comprising a first plurality of nozzles and a second plurality of nozzles opposed thereto, and said step of moving said duster comprises the step of moving said duster in a machine direction past and between said first plurality and said second plurality of nozzles.

3. A process according to claim 2 further comprising a second bank of nozzles, said second bank of nozzles being spaced from said first bank of nozzles in the machine direction, said second bank of nozzles comprising a first plurality of nozzles and a second plurality of nozzles opposed thereto, and said step of moving said duster comprises the step of moving said duster in a machine direction past and between said first pluralities of nozzles and said second pluralities of nozzles of both said banks of nozzles.

4. A process according to claim 3 wherein said second bank of nozzles is selectively operable to blow air on said duster as desired.

5. A process according to claim 4 further comprising the step of determining said size of said duster during said fluffing process and selectively operating said second bank of nozzles in response to said determination of said duster size.

6. A process for de-densifying a laminate, said process comprising the steps of
   providing a continuous laminate having a layer of tow fibers and a layer of sheet material joined in face to face relationship;
   moving said duster relative a bank of nozzles, said bank of nozzles comprising a first plurality of nozzles and a second plurality of nozzles, and said step of moving said laminate comprises the step of moving said laminate in a direction past said first plurality and said second plurality of nozzles, wherein at least one of said nozzles is selectively operable to blow air on said laminate as desired; and
   blowing fluid through at least one said nozzle onto said duster, to cause movement of the tow fibers and thereby fluff said laminate.

7. A process according to claim 6 comprising the steps of moving said laminate intermediate two mutually opposed banks of nozzles while simultaneously and substantially continuously blowing air from said two banks of nozzles onto said laminate.

8. A process according to claim 7 wherein said plane of said laminate is substantially perpendicular to said two banks of nozzles.

9. A process according to claim 7 further comprising the step of cutting said laminate into discrete cleaning articles.

* * * * *